2 Sheets--Sheet 1.

J. R. HALL & C. H. ELLIS.
Meat and Vegetable-Cutters.

No. 140,824. Patented July 15, 1873.

Witnesses.
F. W. Howard
John Cullen

Inventors.
Hall & Ellis
By their Attorney
Chas. F. Stansbury

AM. PHOTO-LITHOGRAPHIC CO. N.Y. (OSBORNES PROCESS)

J. R. HALL & C. H. ELLIS.
Meat and Vegetable-Cutters.
No. 140,824.
2 Sheets--Sheet 2.
Patented July 15, 1873.
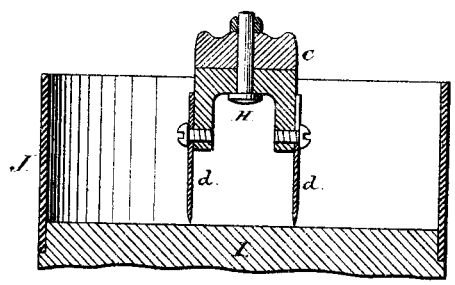
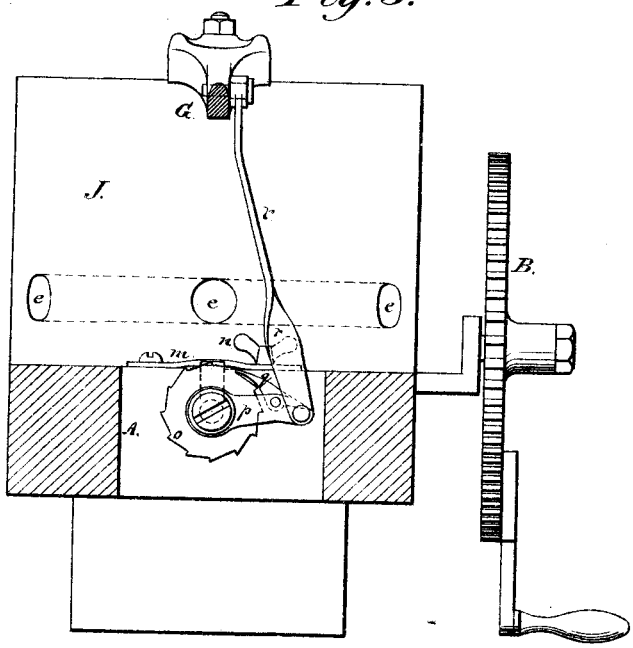
Witnesses.
F. W. Howard
John Cullen
Inventors.
Hall & Ellis
By their Attorney
Chas. F. Stansbury

UNITED STATES PATENT OFFICE.

JERRY R. HALL AND CHARLES H. ELLIS, OF SALEM, OHIO; SAID HALL ASSIGNOR TO SAID ELLIS.

IMPROVEMENT IN MEAT AND VEGETABLE CUTTERS.

Specification forming part of Letters Patent No. 140,824, dated July 15, 1873; application filed March 6, 1873.

*To all whom it may concern:*

Be it known that we, JERRY R. HALL and CHARLES H. ELLIS, both of Salem, Ohio, have invented certain Improvements in Meat and Vegetable Cutters; and we do hereby declare the following to be a full and correct description of the same, reference being had to the accompanying drawings, in which—

Figure 1:
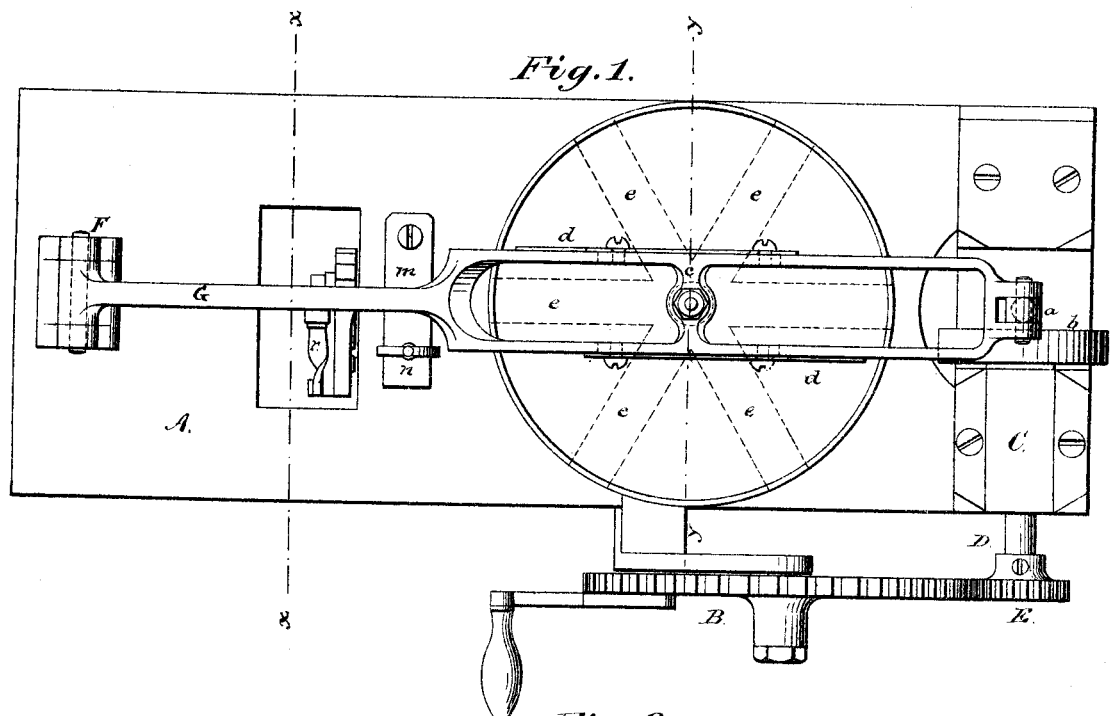
Figure 2:
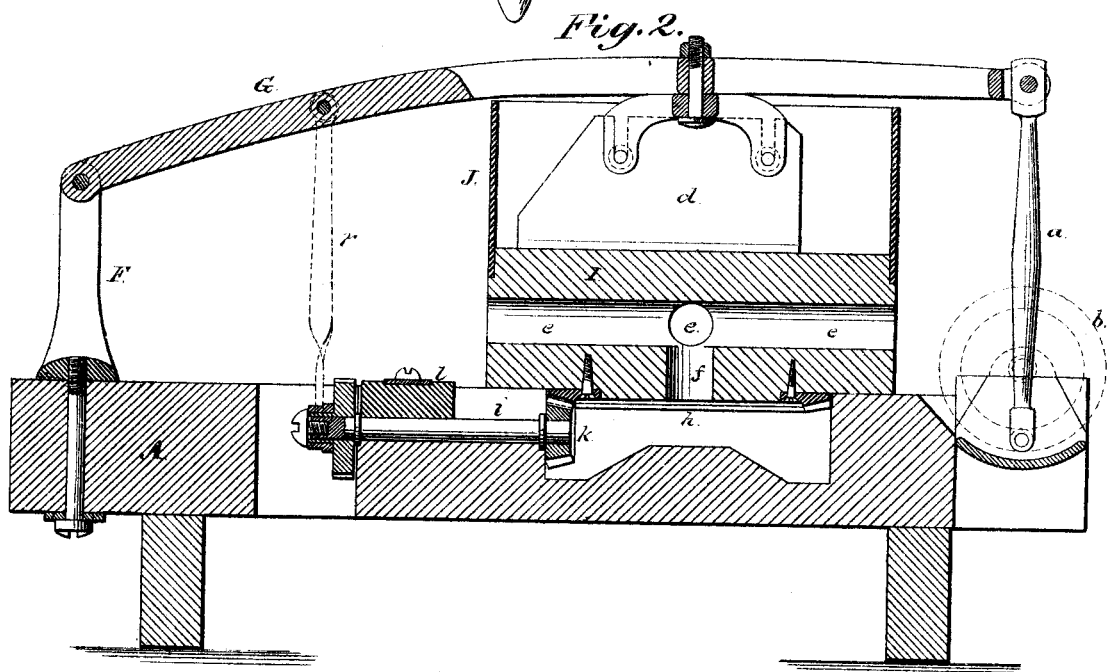

Figure 1 is a top or plan view of our machine. Fig. 2 is a central vertical longitudinal section of the same. Fig. 3 is a vertical transverse section on line $x\ x$ of Fig. 1, showing part of the mechanism for rotating the block. Fig. 4 is a vertical transverse section taken on line $y\ y$ of Fig. 1, showing the cutter-head.

The same part is marked by the same letter wherever it occurs.

This invention relates to certain improvements in machines for cutting meats, vegetables, &c.; and they consist of a vertically-reciprocating arm, a cutter-head on said arm, cutters, a ventilated rotating cutting-block, and mechanism for operating said block, all as hereinafter more particularly set forth.

In the drawings, A represents a base of hard wood, or other suitable material, provided with legs, if desirable, and having bearings for a driving-wheel, B. C is the bearing for shaft D, to which is fixed a pinion, E, that meshes with the driving-wheel B. A fly-wheel (not shown in the drawing) may also be secured on the shaft D when the machine is so large as to require one. The operating mechanism thus described, may, of course, be varied, as seen fit, as we do not confine ourselves to the specific construction shown. F is a bracket secured to the base of the machine, in which is hung one end of an arm, G, made of wood or metal, and having its front portion made open, as shown in Fig. 1. In the front end of this arm a pitman-rod, $a$, is pivoted, which is attached at its lower end to a wrist-pin on a wheel, $b$, which latter is keyed on the end of the pinion-shaft D, by which means a vertically-reciprocating motion is given to arm G. To a cross-bar, $c$, in the open-work part of this arm, a cutter-head, H, is bolted, and cutters or knives $d\ d$ are attached to this head by bolts, &c. The points of the knives are arranged in opposite directions, so as to extend over the whole diameter of the cutting-block, and thus effectually and thoroughly mince or cut the meat or vegetables. This is shown in Fig. 2, where the point of the knife $d$ is to the left of the figure, while the knife on the other side of the head would have its point to the right of the same, as is indicated also in Fig. 1. I is the cutting-block, made of wood in cross-section, so as to present the ends of the grain to the knives. Through this block holes $e\ e$ are bored, radiating from a common center, and a hole is also made vertically through the center of the block extending from its bottom to holes $e$. These holes serve to ventilate the block to prevent its warping, and to permit it to dry more readily after use. A hopper, J, here shown as a detachable cylinder of sheet metal, is placed upon the block, so as to prevent the scattering of the materials operated upon. This block is placed upon the bed A over a cavity, $g$, made therein, and is provided with a circular beveled toothed rack, $h$, which fits loosely in said cavity. $i$ is a shaft having bearings in a groove in the bed, and held in place by a block, $l$, which latter is retained at any desired pressure upon the shaft by a spring, $m$, and its adjusting set-screw $n$, so as to control its rotation. $k$ is a beveled pinion on the end of shaft $i$, which meshes with rack $h$ to rotate the block. The motion imparted to the block is an intermittent rotary one, and is effected by means of a pawl and ratchet operated by connection with the arm G, as follows: $o$ is the ratchet, (see Figs. 2 and 3,) secured to shaft $i$ having an extended hub, on which an arm, $p$, is fitted, and in the end of this arm, on a spring bearing-surface, the pawl $q$ is pivoted. $r$ is the rod, which connects the end of the arm $p$ with the arm G, and communicates the motion of arm G thereto, and, as will be understood, as the arm G is raised and lowered the arm $p$ is also raised and lowered, and causes the pawl to engage with the teeth of the ratchet and drive it around. This rotates the shaft $i$, which, by the meshing of the pinion and toothed rack, turns the block I, whereby the block is caused to present a new surface to the knives every time they descend. The block is rotated as the arm G is elevated, so that the knives will not be clogged by the material being cut, which will be evenly distributed and uniformly operated upon. When the operation is finished, by raising the arm G to its highest point the block can be withdrawn and cleaned.

The effect of making the arm G open at its forward end is to enable the operator to stir the material which may collect between the knives, and also to afford a broad and firm base for the knives.

The head H being bolted to the arm G can be readily removed when it is desired to clean or sharpen the knives.

The greater part of this machine can be made of wood, and, as its parts are but few, its cost is comparatively small.

Having thus fully described our invention, what we claim as new, and desire to secure by Letters Patent, is—

1. The removable cutter-head H, in combination with the knives $dd$ having their points arranged in opposite directions, for the purpose specified.

2. The cutting-block I, provided with holes $ef$ and a hopper, substantially as and for the purpose specified.

3. The combination, in a meat and vegetable cutter, of a perforated cutting-block with a rotating mechanism, substantially such as described.

4. In a meat and vegetable cutter, the combination and arrangement of the crank $b$, pitman $a$, open arm G, cutter-head $c$, cutters $d$, and stanchion F, in the manner described.

The above specification of our said invention signed and witnessed at Salem, Ohio, this 8th day of February, A. D. 1873.

JERRY R. HALL.
CHARLES H. ELLIS.

Witnesses:
JOHN P. HOGAN,
PETER AMBLER.